United States Patent
Assion (10) Patent No.: US 12,355,203 B2
(45) Date of Patent: Jul. 8, 2025

(54) DEVICES AND METHODS FOR CARRIER ENVELOPE PHASE STABILIZATION OF ULTRASHORT AMPLIFIER SYSTEMS

(71) Applicant: NEWPORT CORPORATION, Irvine, CA (US)

(72) Inventor: Andreas Assion, Vienna (AT)

(73) Assignee: NEWPORT CORPORATION, Irvine, CA (US)

( * ) Notice: Subject to any disclaimer, the term of this patent is extended or adjusted under 35 U.S.C. 154(b) by 564 days.

(21) Appl. No.: 17/903,885

(22) Filed: Sep. 6, 2022

(65) Prior Publication Data
US 2024/0079846 A1  Mar. 7, 2024

(51) Int. Cl.
*H01S 3/13* (2006.01)
*H01S 3/00* (2006.01)
(Continued)

(52) U.S. Cl.
CPC .......... *H01S 3/1307* (2013.01); *H01S 3/0057* (2013.01); *H01S 3/10015* (2013.01);
(Continued)

(58) Field of Classification Search
CPC .. H01S 3/1307; H01S 3/0057; H01S 3/10015; H01S 3/10023; H01S 3/1003;
(Continued)

(56) References Cited

U.S. PATENT DOCUMENTS

| | | |
|---|---|---|
| 9,244,332 B1 | 1/2016 | Calendron et al. |
| 2007/0047965 A1 | 3/2007 | Liu et al. |
| 2015/0188275 A1 | 7/2015 | Chang et al. |

FOREIGN PATENT DOCUMENTS

| | | |
|---|---|---|
| EP | 2740186 B1 | 2/2019 |
| KR | 1020090053640 A | 5/2009 |

OTHER PUBLICATIONS

A the International Search Report issued for WO counterpart application No. PCT/US2023/030474 mailed Dec. 8, 2023 (3 pages).
(Continued)

*Primary Examiner* — Kinam Park
(74) *Attorney, Agent, or Firm* — Brian F. Swienton (57) ABSTRACT

A method of carrier envelope phase stabilization is disclosed which includes temporally stretching a oscillator output signal to produce at least one stretcher output signal, splitting the stretcher output signal to produce a forward bypass signal, amplifying the stretcher output signal to produce at least one amplifier output signal, compressing the amplifier output signal to produce at least one compressor output signal, compressing the forward bypass signal to form at least one fast loop signal, measuring the carrier envelope offset frequency ($f_{ce}$) and the carrier envelope noise ($f_{noise}$) of the fast loop signal, generating at least one correction signal based on at least one of the carrier envelope offset frequency ($f_{ce}$) the carrier envelope noise ($f_{noise}$), and adjusting the frequency characteristic of at least one of the oscillator signal and the stretcher output signal based on the correction signal.

20 Claims, 6 Drawing Sheets

(51) Int. Cl.
*H01S 3/10* (2006.01)
*H01S 3/1106* (2023.01)
*H01S 3/16* (2006.01)

(52) U.S. Cl.
CPC ........ *H01S 3/10023* (2013.01); *H01S 3/1003* (2013.01); *H01S 3/1301* (2013.01); *H01S 3/1305* (2013.01); *H01S 3/0014* (2013.01); *H01S 3/0085* (2013.01); *H01S 3/1106* (2013.01); *H01S 3/1625* (2013.01); *H01S 3/1636* (2013.01)

(58) Field of Classification Search
CPC .... H01S 3/1301; H01S 3/1305; H01S 3/0014; H01S 3/0085; H01S 3/1106; H01S 3/1625; H01S 3/1636
See application file for complete search history.

(56) References Cited

OTHER PUBLICATIONS

A the Written Opinion issued for WO counterpart application No. PCT/US2023/030474 mailed Dec. 8, 2023 (5 pages).

DEVICES AND METHODS FOR CARRIER ENVELOPE PHASE STABILIZATION OF ULTRASHORT AMPLIFIER SYSTEMS

BACKGROUND

Figure 1:
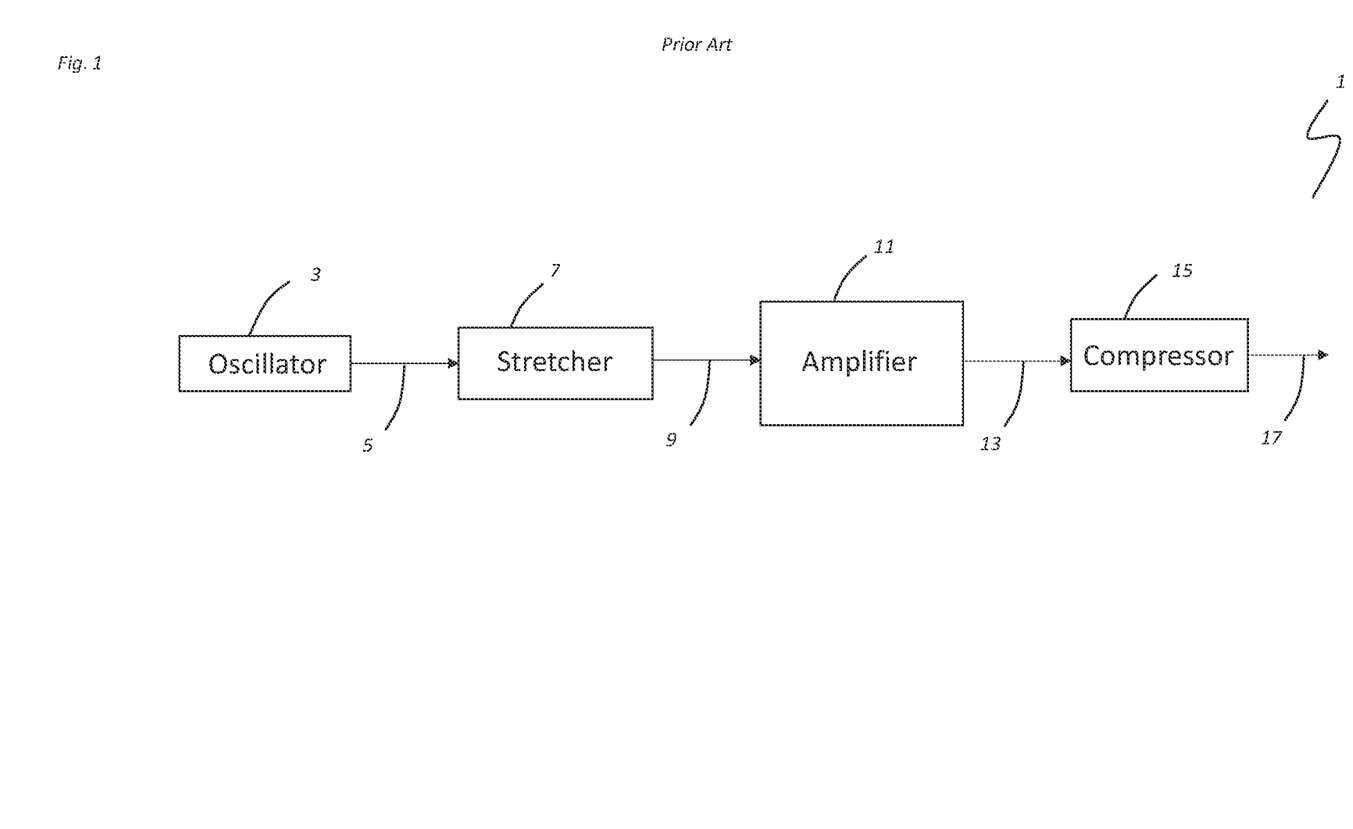
FIG. 1 shows a schematic diagram of an embodiment of a prior art ultra-short pulse amplifier system.

Laser devices and amplifiers capable of producing ultrashort laser pulses are used in a variety of applications. Often, these systems employ amplifier systems to produce sub-picosecond laser pulses. FIG. 1 shows an embodiment of an ultra-short pulse amplifier system 1 which includes a seed oscillator 3 configured to output a seed laser signal 5. As shown, a stretcher 7 is configured to receive the oscillator output signal 5 and output a stretched signal 9 which is directed into an amplifier 11. The amplifier 11 amplifies the stretched signal 9 and outputs an amplified signal 13 which is directed into a compressor 15. The compressor 15 compresses the amplified signal 13 and outputs an output signal 17.

While presently available ultra-short pulse amplifier systems have proven useful in the past, a number of shortcomings have been identified. For example, before amplification, the seed laser signal 5 is stretched in time to about one hundred picoseconds (100 ps) or more, then amplified with the amplifier 11. Thereafter, the amplified signal 13 is recompressed with the compressor 15 to a sub-picosecond output signal 17. Ideally, the carrier envelope phase (CEP) of the laser pulse, which defines the electric field form, is precisely stabilized and controlled. Stabilization of the CEP may be achieved by reducing or eliminating noise generated within the amplifier system as CEP has high dispersion dependence. Unfortunately, stretchers and compressors commonly used in amplifier systems are large frequency-dependent noise sources in the amplifier system. Further, the amount of unwanted noise grows very quickly, even at frequencies as low as 1 kHz. In addition, acoustic noise from any variety of additional components and/or systems used in the laser device or surrounding environment may exasperate the difficulty of CEP stabilization.

Various CEP stabilization architectures for laser amplifier systems have been developed. While some of these systems have proven somewhat useful, a number of shortcomings have been identified. For example, a fundamental problem in conventional CEP stabilization schemes is that the measurement of the CEP noise is limited by the repetition rate of the amplifier. More specifically, accurate measurement and control of laser amplifier systems operating in high frequencies (10 Hz-10 kHz), the frequency range where the noise is introduced, has proven problematic.

In light of the foregoing, there is an ongoing need to a device for carrier envelope phase stabilization for use in ultrafast laser amplifiers. In addition, the is an ongoing need for a method for carrier envelope phase stabilization for use in ultrafast laser amplifiers. Furthermore, there is an ongoing need for a method for carrier envelope phase stabilization for use in ultrafast laser amplifiers, that is not limited by the repetition rate of the amplifier.

SUMMARY

The present application is directed to various embodiments of devices and methods for carrier envelope phase stabilization for use in a variety of laser amplifier systems and similar laser devices. In one embodiment, the carrier envelope phase stabilization system disclosed herein includes at least one oscillator configured to output at least one oscillator output signal. In some embodiments the oscillator may be configured to output at least one oscillator reference signal in addition to the oscillator output signal. At least one stretcher may be used to temporally stretch the pulse width of the oscillator output signal to produce at least one stretcher output signal. In one embodiment, the stretcher may be configured to receive a femtosecond oscillator output signal and output at least one stretcher output signal having a pulse width from 10 ps to 100 ps or more. At least one beam splitter may be configured to direct the at least a portion of the stretcher output signal to form at least one forward bypass signal. Further, at least one amplifier may be configured to receive and amplify at least a portion of the stretcher output signal from the beam splitter to produce at least one amplifier output signal which may be directed to at least one compressor. The compressor may be configured to receive and temporally compress the amplifier output signal and the forward bypass signal and output at least one fast loop signal and at least one compressor output signal. At least one fast loop analyzing device may be used to receive the at least one fast loop signal and measure at least one frequency characteristic of the fast loop signal. For example, the fast loop analyzing device may be configured to measure the carrier envelope offset frequency ($f_{ce}$) and a carrier envelope noise ($f_{noise}$) of the fast loop signal. At least one analyzing device, in communication with the fast loop analyzing device may be configured to generate at least one correction signal based on at least one measured frequency characteristic of the fast loop signal. Finally, the correction signal may be used to correct at least one frequency characteristic of at least one of the oscillator output signal and/or the stretcher output signal. For example, the oscillator may be adjusted to vary at least one frequency characteristic of the oscillator output signal. In contrast, one or more frequency shifting devices or the like may be used to vary at least one frequency characteristic of at least one of the oscillator output signal and/or the stretcher output signal.

In another embodiment, the present application discloses various method of stabilizing the carrier envelope phase of an ultrashort laser pulse from a laser amplifier system. In one embodiment, the method of carrier envelope phase stabilization includes providing at least one oscillator output signal which may be temporally stretched by at least one stretcher to produce at least one stretcher output signal. Thereafter, at least one forward bypass signal may be formed from the stretcher output signal with at least one beam splitter. The remaining stretcher output signal may be directed into at least one amplifier configured to output at least one amplifier output signal. The amplifier output signal may be compressed with a compressor. In addition, the compressor may be configured to compress the forward bypass signal to form at least one fast loop signal. The fast loop signal may be measured with at least one analyzing device to determine the carrier envelope offset frequency ($f_{ce}$) and the carrier envelope noise ($f_{noise}$) In response, at least one correction signal may be generated based on the carrier envelope offset frequency ($f_{ce}$), the carrier envelope noise ($f_{noise}$). Finally, the frequency characteristic of at least one of the oscillator signal and the stretcher output signal may be adjusted based on the correction signal.

In another embodiment, the present application discloses a method of stabilizing the carrier envelope phase of an ultrashort laser pulse from a laser amplifier system. More specifically, the method includes outputting at least one oscillator output signal from at least one oscillator and temporally stretching the oscillator output signal with at least one stretcher to form at least one stretcher output signal. Thereafter, at least one amplifier input signal and at least one forward bypass signal may be formed from the at least one stretcher output signal. The amplifier input signal may be amplified with at least one amplifier to form at least one amplifier output signal. The amplifier output signal and the forward bypass signal may be compressed by at least one compressor to produce at least one compressor output signal and at least one fast loop signal. The methods further includes measuring the carrier envelope offset frequency ($f_{ce}$), and the carrier envelope noise ($f_{noise}$) of the fast loop signal and generating at least one correction signal. The correction signal may be used in adjusting at least one frequency characteristic of the amplifier input signal.

In yet another embodiment, the present application discloses a laser amplifier system having a carrier envelope phase stabilization architecture for generating ultrashort laser pulses. The laser amplifier system may include at least one oscillator configured to output at least one oscillator output signal. At least one stretcher configured to temporally stretch the pulse width of the oscillator output signal may be used to produce at least one stretcher output signal. At least one beam splitter may be configured to generate at least one amplifier input signal and at least one forward bypass signal by splitting the stretcher output signal. The amplifier input signal may be amplified by at least one amplifier output signal. Thereafter, the amplifier may be configured to output at least one amplifier output signal. At least one compressor may be configured receive and temporally compress the amplifier output signal and the forward bypass signal and output at least one fast loop signal and at least one compressor output signal. At least one fast loop analyzing device may be configured to receive the fast loop signal and measure at least one of a carrier envelope frequency and a carrier envelope of frequency noise introduced by stretcher and compressor. Thereafter, at least one analyzing device configured to generate at least one correction signal based on a at the carrier envelope frequency and a carrier envelope of frequency of the at least one fast loop signal and provide the at least one correction signal to the at least one oscillator.

Finally, the present application discloses a method of stabilizing the carrier envelope phase of an ultrashort laser pulse from a laser amplifier system. The method includes providing at least one oscillator output signal. Temporally stretching the oscillator output signal to produce at least one stretcher output signal. Thereafter, at least one amplifier input signal and at least one forward bypass signal may be formed from the stretcher output signal. The amplifier input signal may be directed into at least one amplifier configured to output at least one amplifier output signal. The amplifier output signal and the forward bypass signal may be directed into at least one compressor which compresses the signals and outputs at least one compressor output signal and at least one fast loop signal. Thereafter, at least one analyzing device may be used to determine at least one carrier envelope offset frequency ($f_{ce}$), and the carrier envelope noise ($f_{noise}$) of the fast loop signal. At least one correction signal is generated based on at least one of the at least one of the carrier envelope offset frequency ($f_{ce}$) and the carrier envelope noise ($f_{noise}$). Thereafter, the oscillator may be adjusted and to vary at least one frequency characteristic of the oscillator signal based on the correction signal.

Other features and advantages of the devices and methods for carrier envelope phase stabilization will become apparent from a consideration of the following detailed description.

BRIEF DESCRIPTION OF THE DRAWINGS

The drawings disclose illustrative embodiments and are not intended to set forth all embodiments of the devices and methods for carrier envelope phase stabilization for laser amplifier systems. Details that may be apparent or unnecessary may be omitted to save space or for more effective illustration. Conversely, some embodiments may be practices without all the detailed disclosed with regard to specific embodiments. When the same reference numbers appear in different drawings, the reference numbers refer to same or similar components or steps. The novel aspects of the devices and methods for carrier envelope phase stabilization as disclosed herein will become more apparent by consideration of the following figures, wherein.

DESCRIPTION

The present application is directed to various embodiments of devices and methods for carrier envelope phase stabilization of optical amplifier systems. In one embodiment, the carrier envelope phase stabilization systems and methods described herein may be used with ultrafast amplifier systems, although those skilled in the art will appreciate that the carrier envelope phase stabilization systems and methods disclosed herein may be used with any variety of optical systems. Unlike prior art systems and devices, the various embodiments of the of carrier envelope phase stabilized regenerative amplifier system (hereinafter CEP-stabilized regenerative amplifier system) described herein include at least one forward bypass signal configured to forego amplification within amplifier. As such, the various embodiments of the ultrashort amplifier systems disclosed herein, in cooperation with U.S. Pat. No. 8,416,819, the contents of which are incorporated by reference in its entirety herein, are capable of measuring the carrier envelope frequency noise at the full repetition rate of the seed oscillator, which is about 8000 to about 80000 times larger than the repetition rate of the amplified laser pulse generated by the amplifier. As such, the carrier envelope stabilization systems described herein analyze the carrier envelope frequency and frequency noise introduced by the stretcher/compressor and make adjustments to the various components of the laser amplifier system in response thereto. Thereafter, the carrier envelope phase (hereinafter CEP) noise may be directly subtracted from the oscillator signal by means of one or more optical devices and/or systems, such as acousto-optical frequency shifters and the like. As a result, the various embodiments disclosed herein permit control rates in excess of 100 kHz thereby offering CEP stabilization independent of repetition rate while maintaining high beam quality and low noise performance.

Exemplary embodiments are described below with reference to the accompanying drawings. Unless otherwise expressly stated in the drawings the sizes, positions, etc., of components, features, elements, etc., as well as any distances therebetween, are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one node could be termed a "first interferometer" and similarly, another node could be termed a "second interferometer", or vice versa.

Unless indicated otherwise, the term "about," "thereabout," etc., means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Many of the embodiments described in the following description share common components, device, and/or elements. Like named components and elements refer to like named elements throughout. For example, all the embodiments described in the following detailed description include at least one oscillator, at least one stretcher, at least one amplifier, at least one compressor, at least one forward bypass signal, at least one slow loop signal and at least one fast loop signal. Thus, the same or similar named components or features may be described with reference to other drawings even if they are neither mentioned nor described in the corresponding drawing. Also, even elements that are not denoted by reference numbers may be described with reference to other drawings. In addition, some terms used herein refer to a particular function a device accomplishes and should not be considered limiting. For example, the term "beam splitting device" may refer to a system or device configured to divide an incident optical signal. As such, those skilled in the art should appreciate that the "beam splitting device" or "beam splitter" may include one or more mounts and/or control systems configured to support and selectively position the beam splitting optic or device.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art.

The various embodiments shown in FIGS. 2-6 include at least one slow loop measurement architecture utilizing at least one f to 2f interferometer to provide a spectrogram of an output signal to permit phase determination. In addition, the various embodiments shown in FIGS. 2-6 include at least one forward bypass architecture to provide an unamplified bypass signal to at least one fast loop measurement system. The unamplified bypass signal is stretched by at least one stretcher and compressed by at least one compressor, foregoing amplification by the amplifier. This signal is then directed to the fast loop measurement system which includes at least one f to 2f interferometer configured to measure temporal variations in the signal thereby permitting the measurement of noise introduced by at least one of the stretcher and/or the compressor. The inclusion of the forward bypass architecture and fast loop measurement architecture allows measurement of high frequency noise introduced by at least one of the stretcher, amplifier, and/or compressor. In one embodiment, the frequency of the high frequency noise measured by the fast loop measurement architecture would be difficult and/or impossible with the slow loop measurement f to 2f interferometer. In addition, unlike prior art systems, the present systems disclosed in FIG. 206 permit measuring and controlling the CEP noise of the optical pulse at higher frequencies then previous systems and, thus, are not limited by the repetition rate of the amplifier.

Figure 2:
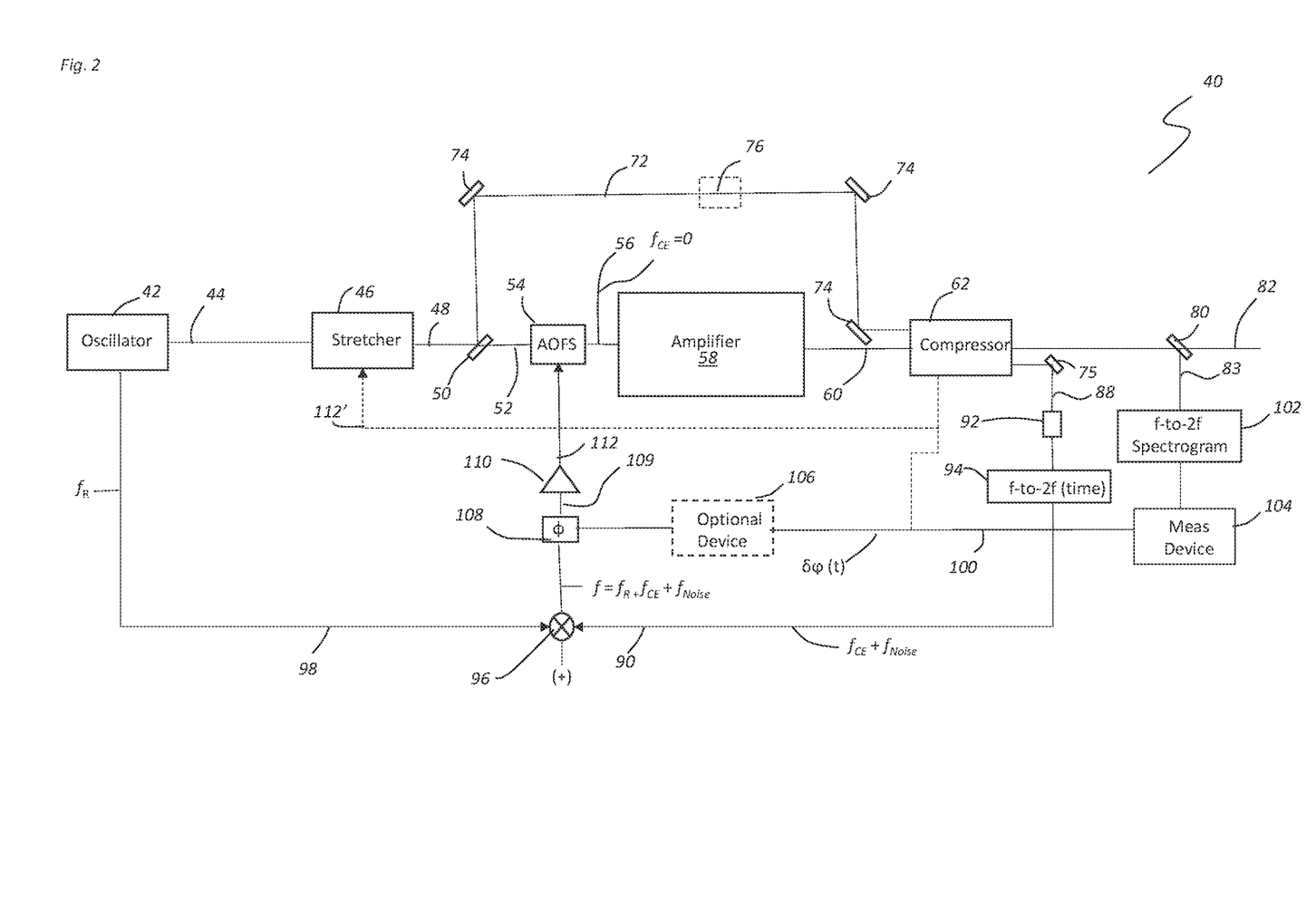
FIG. 2 shows a schematic diagram of an embodiment of an ultra-short pulse amplifier system having a carrier envelope phase stabilization architecture.

FIG. 2 shows an embodiment of CEP-stabilized regenerative amplifier system used to produce ultra-short laser pulses. As shown, the amplifier system 40 includes at least one oscillator 42 configured to output at least one oscillator output signal or seed signal 44. In one embodiment, the oscillator 42 comprises at least one Ti:Sapphire oscillator although those skilled in the art will appreciate that any variety of oscillator devices may be used in the present system. For example, in one embodiment the oscillator 42 comprises an erbium-doped fiber laser system. In one embodiment, the oscillator 42 may be configured to generate at least one oscillator output signal 44 having pulse durations of less than tens of femtoseconds (<10 fs) to pulse durations of hundreds of femtoseconds or longer (>300 fs), although those skilled in the art will appreciate that the present system may be used with oscillators configured up with a variety of pulse durations. Further, in one embodiment, the oscillator 42 has a repetition rate of about 10 MHz to about 200 MHz. In another embodiment, the oscillator 42 has a repetition rate of about 50 MHz to about 100 MHz. Optionally, the oscillator 42 has a repetition rate of about 80 MHz. The oscillator output signal 44 is directed into at least one stretcher 46 configured to stretch the oscillator output signal 44 to produce at least one stretcher output signal 48. During use, the stretcher 46 may be configured to temporally stretch the incoming oscillator output signal 44 having a pulse width from less than tens of femtoseconds (<10 fs) to pulse widths of a hundred picoseconds (>100 ps). For example, in in one specific embodiment, the stretcher 46 may be configured to stretch an oscillator output signal having a pulse width of about 20 fs to provide at least one stretcher output signal 48 having a pulse width of about 120 ps. In another embodiment, the stretcher 46 may be configured to temporally stretch an input signal having a femtosecond pulse width to produce at least one stretcher output signal 48 having a pulse width of 1 picosecond or more. In one embodiment, the stretcher output signal 48 has a pulse width of about 10 ps or more. In another embodiment, the stretcher output signal 48 has a pulse width of about 100 ps or more. Optionally, the stretcher output signal 48 may have a pulse width of about 300 ps or more. As shown, the stretcher output signal 48 is directed to at least one beam splitter, prism, or similar device 50 configure to direct a portion of the stretcher output signal 48 to at least one acoustic optic frequency shifter or similar frequency shifting device or system 54 (hereinafter AOFS 54), thereby forming at least one AOFS output signal 56. In one embodiment, the AOFS 54 may be configured to reduce or eliminate the noise introduced by the stretcher 46 (and/or amplifier 58 and compressor 62), essentially reducing or eliminating the noise in the stretcher output signal 48, before amplifying the signal with the amplifier 58. At least one amplifier 58 may be configured to receive and amplify the AOFS output signal 56 and output at least one amplifier output signal 60. In one embodiment, the amplifier 58 comprises regenerative amplifier, although those skilled in the art will appreciate that any variety of amplifier devices or systems may be used with the present system. Optionally, the amplifier output signal 60 may have a repetition rate of about 5000 times to about hundred 150,000 times slower than repetition rate of the oscillator output signal 44 received from the oscillator 42. In another embodiment, the amplifier output signal 60 may have a repetition rate of about 8000 times to about hundred 80,000 times slower than repetition rate of the oscillator output signal 44 received from the oscillator 42.

Referring again to FIG. 2, of a portion of the stretcher output signal 48 may be directed by the beam splitter 50 configured to form at least one forward bypass signal 72 (hereinafter bypass signal 72). As shown, the bypass signal 72 may be directed by one or more mirrors or similar devices 74 to the compressor 62 without traversing through or being amplified by the amplifier 58. Optionally, the bypass signal 72 may be directed through one or more optional optical elements 76. Exemplary optional optical elements 76 include, without limitations, sensors, lenses, gratings, filters, analysis devices or systems, stretchers, compressors, detectors, and the like.

As shown in FIG. 2, the compressor 62 may be configured to receive the amplifier output signal 60 and the bypass signal 72 and output at least one compressor output signal 82 therefrom. In one embodiment, the compressor output signal 82 may have a pulse width from about 20 fs to about 100 fs, although those skilled in the art will appreciate that the compressor output 82 may have any variety of pulse widths. In another embodiment, the compressor output 82 may have a power from about 10 µJ to about 100 mJ, although those skilled in the art will appreciate that the compressor output signal 82 may have any variety of output powers. Further, the compressor 62 may be configured to output any number of output signals. For example, as shown in FIG. 2, the compressor 62 may be configured to output at least one compressed bypass signal 88 which may be directed by at least one mirror 75 to at least one fast loop interferometer 94 or similar analyzing device. In one embodiment, the compressed bypass signal 88 comprises the compressed unamplified bypass signal 72 received from the stretcher 46. In one embodiment, the compressed bypass signal 88 is directed to one or more dispersion mediums or devices 92 and the fast loop interferometer 94. In the illustrated embodiment, the dispersion medium 92 comprises a SF 57 glass block, although those skilled in the art will appreciate that any variety of dispersion mediums or devices may be used. Optionally, the system 40 need not include a dispersion medium 92.

Referring again to FIG. 2, the fast loop interferometer 94 may be configured to receive the compressed bypass signal 88 and output at least one fast loop electrical signal 90 in response thereto. As shown, the fast loop electrical signal 90 may be directed to the AOFS 54. Optionally, the fast loop electrical signal 90 may be directed to at least one of the oscillator 42, the stretcher 46, the AOFS 54, and/or the compressor 62. Further, the fast loop electrical signal 90 may be combined with at least one secondary oscillator signal 98 via at least one summing device 96. In one embodiment the fast loop interferometer 94 comprises a f-to-2f (time) interferometer, although those skilled in the art will appreciate that any variety of alternate analyzing devices may be used with the present system. For example, the fast loop interferometer 94 may be configured to measure temporal characteristics of the compressed bypass signal 88. In one embodiment, the fast loop interferometer 94 may be configured to compare, in combination with the slow loop interferometer 102 described below, the temporal characteristics of the amplifier output signal 60 to the temporal characteristics of the forward bypass signal 72. In one embodiment, the sampling rate of the fast loop interferometer 94 may be determined by the repetition rate of the oscillator 42. For example, in one embodiment, the sampling rate is about 80 MHz, although those skilled in the art will appreciate that any sampling rate may be used. As such, the fast loop interferometer 94 may be configured to measure the carrier envelope offset frequency (fc E) which may be determined by the oscillator 42. In addition, the fast loop interferometer 94 may be configured to measure the carrier envelope phase noise in time ($f_{noise}$) which is introduced by at least one of the stretcher 46, amplifier, and/or the compressor 62.

Referring again to FIG. 2, a portion of the compressor output signal 82 may be directed by at least one output beam splitter 80 to form at least one compressed amplified signal 83 which may be directed to at least one slow loop interferometer or similar analyzing device 102 configured to analyze at least one characteristic of the compressed amplified signal 83 and output at least one slow loop electrical signal 100 in response thereto. For example, in one embodiment the slow loop interferometer 102 may be configured to measure the carrier envelope phase drift of the compressed amplified signal 83 and output at least one slow loop electrical signal 100. As such, the slow loop interferometer 102 may comprise at least one f-to-2f interferometer device configured to measure at least one spectral characteristic of the compressed amplified signal 83. Further, at least one measuring device 104 may be configured to measure various other characteristics of the compressed amplified signal 83 by analyzing the slow loop electrical signal 100 from the slow loop interferometer 102. In one embodiment, the measuring device 104 comprises a phase measuring device, although those skilled in the art will appreciate that any variety of measuring devices may be used. Exemplary measuring devices include, without limitation, oscilloscope, and the like. Further, one or more optional analyzing devices 106 may be included within the CEP-stabilized regenerative amplifier system 40 and configured to measures any number of additional characteristics of the slow loop electrical signal 100.

As shown in FIG. 2, the oscillator 42 may be configured to provide at least one secondary oscillator signal 98. In one embodiment, the secondary oscillator signal 98 may providing data (e.g. repetition rate, a multiple of the repetition rate, or other data) to various other components within the CEP-stabilized regenerative amplifier system 40. For example, in one embodiment, the repetition rate of the oscillator may be provided in some cases because the AOFS efficiency is higher at higher frequencies (e.g. 100 MHz). In an alternate embodiment, the secondary oscillator signal 98 may represent the at least one characteristic of the repetition rate of the oscillator 42. As shown, at least one summing device 96 may be positioned within the CEP-stabilized regenerative amplifier system 40. The summing device 96 may be configured to add the frequency information relating to the repetition rate ($f_R$) from the secondary oscillator signal 98 to the measured the carrier envelope offset frequency ($f_{CE}$) and the carrier envelope phase noise in time ($f_{noise}$) received from the fast loop signal 90 which may be directed into at least one phase shifter 108 configured to output at least one corrected signal 109. The phase shifter 108 receives the frequency information from the summing device 96 and the slow loop signal 100 and outputs at least one corrected signal 109 which may be directed to at least one signal amplifier 110 which is configured to amplify the corrected signal 109 and output at least one correction signal 112. The correction signal 112 may be applied to the AOFS 54 for frequency and/or phase correction.

Figure 3:
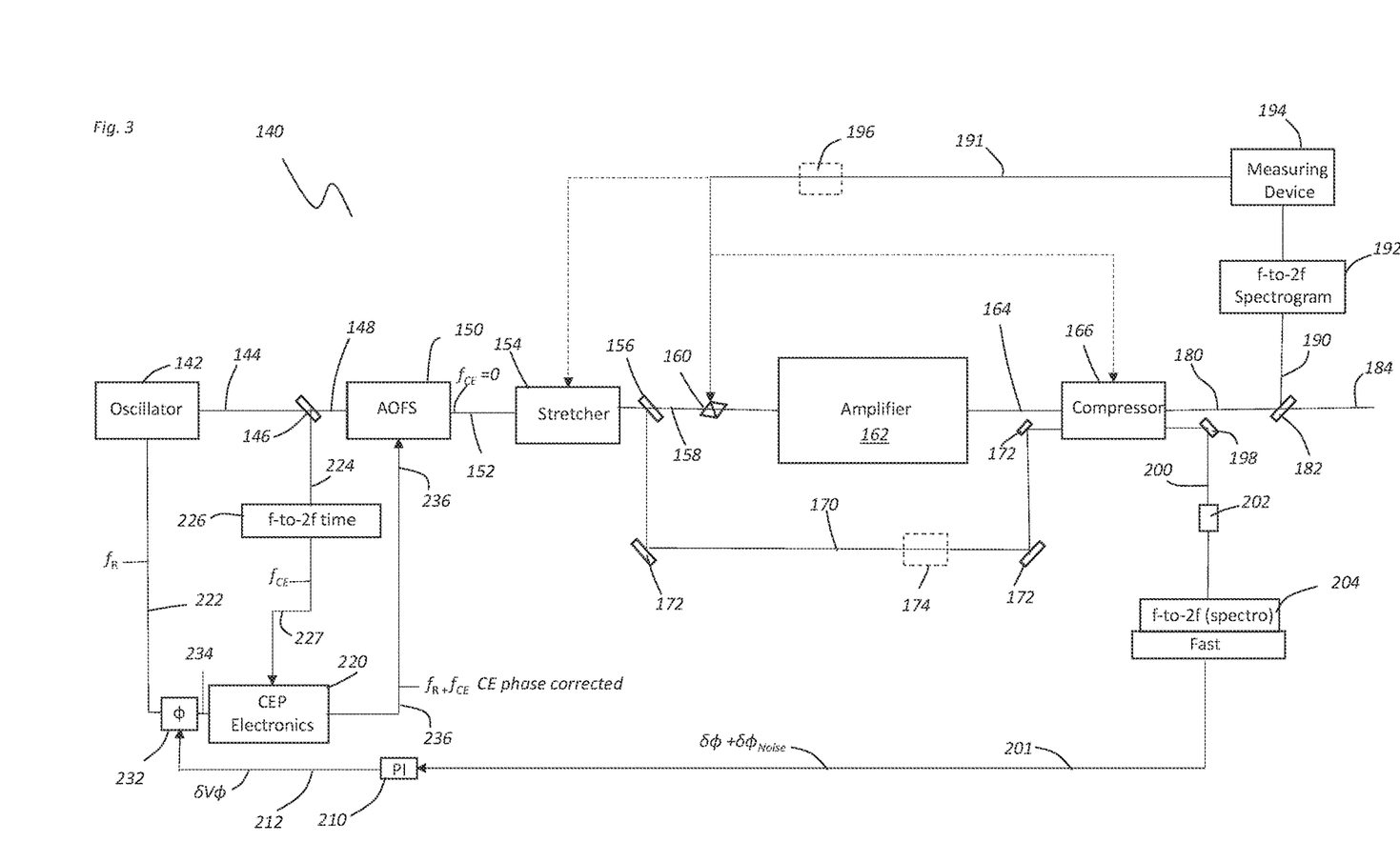
FIG. 3 shows a schematic diagram of another embodiment of an ultra-short pulse amplifier system having a carrier envelope phase stabilization architecture.

FIG. 3 shows another embodiment of a CEP-stabilized regenerative amplifier system 140. Like the previous embodiment, the amplifier system 140 includes at least one oscillator 142 configured to output at least one oscillator output signal 144. The oscillator 142 may comprises at least one Ti:Sapphire oscillator although those skilled in the art will appreciate that any variety of oscillator devices may be used in the present system. In one embodiment, the oscillator 142 may be configured to generate at least one oscillator output signal 144 having pulse durations of less than tens of femtoseconds (<10 fs) to pulse durations of hundreds of femtoseconds or longer (>300 fs), although those skilled in the art will appreciate that the present system may be used with oscillators configured up with a variety of pulse durations. Further, in one embodiment, the oscillator 142 has a repetition rate of about 10 MHz to about 200 MHz. In another embodiment, the oscillator 142 has a repetition rate of about 50 MHz to about 100 MHz. At least one beam splitter 146 may be configured to direct at least a portion of the oscillator output signal 144 to form at least one oscillator output signal 224 which may be directed to at least one CEP electronics suite 220. In the illustrated embodiment, at least one interferometer or similar device 226 (such as a f-to-2f interferometer) may be used to analyze the oscillator output signal 244. In one embodiment, the CEP electronics suite 220 may include one or more electronic components, devices, and/or systems configured to analyze, measure, or otherwise modify at least one characteristic of the oscillator output signal 244. Further, at least a portion of the oscillator output signal 244 may be directed into at least one AOFS 150. Exemplary AOFS 150 include the device disclosed in U.S. Pat. No. 8,416,819, the entire contents of which are incorporated by reference in its entirety herein.

Referring again to FIG. 3, the AOFS 150 may be configured to output at least one AOFS output signal 152 which may be directed to at least one stretcher 154. Like the previous embodiment, the stretcher 154 may be configured to temporally stretch the AOFS output signal 152 having a pulse width from about 5 fs to about 100 fs to produce at least one amplifier input signal 158 having pulse width from about 10 ps to about 100 ps. Optionally, the amplifier input signal 158 may have a pulse width of 300 ps or more. The amplifier input signal 158 may be directed to at least one beam splitter 156 configured to produce at least one amplifier bypass signal 170. In one embodiment, the bam splitter 156 may be positioned on a optical mount (not shown) configured to be selectively movable. In addition, a portion of the amplifier input signal 158 may be directed into at least one amplifier 162 configured to produce at least one amplifier output signal 164. In one embodiment, the amplifier 162 comprises regenerative amplifier, although those skilled in the art will appreciate that any variety of amplifier devices or systems may be used with the present system. Optionally, the amplifier output signal 164 may have a repetition rate of about 5000 times to about hundred 150,000 times slower than repetition rate of the oscillator output signal 144 emitted from the oscillator 142. In another embodiment, the amplifier output signal 164 may have a repetition rate of about 8000 times to about hundred 80,000 times slower than repetition rate of the oscillator output signal 144 from the oscillator 142 via the AOFS 150 and stretcher 154.

As shown in FIG. 3, the amplifier output signal 164 is directed into at least one compressor 166. Further, the compressor 166 may be configured to receive at least a portion of the amplifier bypass signal 170. The amplifier bypass signal 170 may comprise a portion of the amplifier input signal 158 directed to the compressor 166 without undergoing amplification by the amplifier 162. One or more mirrors 172 may be configured to direct at least a portion of the amplifier bypass signal 170 and the compressor 166. Optionally, at least one optional optical device or system 174 may be used to condition or otherwise modify the amplifier bypass signal 170. Optional optical devices 174 include, without limitations, measuring devices, sensors, analyzers, gratings, filters, lenses, mirrors, beam dumps, beam splitters, and the like. Like the previous embodiment, the compressor 166 may be tuned to compress the temporal changes introduced into the AOFS output signal 152 (and by extension the oscillator output signal 144) by the stretcher 154. As such, the stretcher 154 may be selected to alter at least one temporal characteristic of an input signal while the compressor 166 may be configured to reverse the temporal effects of the altered temporal characteristic introduced by the stretcher 154.

Referring again to FIG. 3, the compressor 166 may be configured to output at least one compressor output signal 184 from the CEP-stabilized regenerative amplifier system 140. As shown, at least one beam splitter 182 may direct at least a portion of the compressor output signal 184 to form at least one slow loop signal optical 190. As shown, like the previous embodiment, at least one interferometer 192 may be configured to observe/analyze at least one optical characteristic of the slow loop optical signal 190 and output at least one slow loop electrical signal 191. For example, the slow loop interferometer 192 may be configured to measure and compensate for CEP drift. In another embodiment, the slow loop electrical signal 191 outputted by the slow loop interferometer 192 may be used to adjust CE phase values. In one embodiment, the interferometer 192 comprises a f-to-2f device configured to spectrogram or similar spectral representation of the compressor output signal 184. Those skilled in the art will appreciate that any variety of interferometers of spectral analyzers may be used in the present system. In addition, one or more measuring devices 194 may similarly be used in the present system to measure CEP based on data (e.g. a spectrogram) measured by the slow loop interferometer 192. Optionally, one or more optional devices 196 may be used to measure or otherwise condition the slow loop electrical signal 191. Exemplary optional devices 196 include, without limitations, phase shifters, amplifiers, filters, electrical measurement devices and the like. As shown in FIG. 3, at least one prism pair or similar beam combining device 160 may be used to combine the slow loop electrical signal 191 and the amplifier input signal 158, which is directed back into the amplifier 162. Again, like the beam splitter 156, the beam combining device 160 may be positioned on an optical mount (not shown) configured to be selectively positionable. Optionally, the slow loop electrical signal 191, or a portion thereof, may be directed into the stretcher 154 or compressor 166. As such, the CEP-stabilized regenerative amplifier system 140 shown in FIG. 3 need not include the beam combining device 160.

As shown in FIG. 3, the compressor 166 may be configured to output at least one fast loop optical compressed signal or feedback signal 200. In one embodiment, the fast loop compressed optical signal 200 comprises the compressed unamplified forward bypass signal 170 received from the stretcher 154. In one embodiment, fast loop compressed optical signal 200 is directed to one or more dispersion mediums or devices 202 and to at least one fast loop interferometer or similar analyzing device or system 204 by at least one mirror 198. In the illustrated embodiment, the dispersion medium 202 comprises a SF57 glass block, although those skilled in the art will appreciate that any variety of dispersion mediums or devices may be used. Further, the fast loop interferometer 204 may comprise at least one f-to-2f interferometer, although those skilled in the art will appreciate that any variety of alternate analyzing devices may be used with the present system. In one embodiment, the fast loop interferometer 204 has a sampling rate greater than about 5 kHz. In another embodiment, the fast loop interferometer 204 has a sampling rate of about 10 kHz or greater, although those skilled in the art will appreciate that the fast loop interferometer 204 may have any desired sampling rate. For example, the interferometer 204 may be configured to analyze the fast loop compressed optical signal 200 and output at least one fast loop electrical signal 201 based on measured characteristics of the fast loop compressed optical signal 200 (e.g. temporal characteristics). For example, the fast loop interferometer 204 (spectrogram based) may be configured to measure the carrier envelope offset phase ($\varphi cE$) changes determined by the stretcher 154, amplifier 162, and/or compressor 166. In addition, the fast loop interferometer 204 may be configured to measure the carrier envelope phase noise in time (ST) introduced by one of the stretcher 154, amplifier 162 and the compressor 166 or, in the alternative, the combination of the stretcher 154, amplifier 162 and the compressor 166.

Referring again to FIG. 3, at least one controller device 210 may be configured to receive at least a portion of the fast loop electrical signal 201. In one embodiment, the controller device 210 comprises at least one proportional-integral-derivative (PID) controller, although those skilled in the art will appreciate that any variety of controlling devices may be used with the present system. The controller device 210 may be configured to output at least one controller or PID signal 212 (hereinafter PID signal 212) to at least one phase shifter 232 or similar device in response to information or data received from the fast loop electrical signal 201.

As described above, a portion of the oscillator output signal 144 may be directed to at least one CEP electronics suite 220. As shown at least one interferometer or similar analyzing device 226 may be configured to measure the oscillator analysis signal 224 directed to the CEP electronics suite 220 by the beam splitter 146 and output at least one electrical signal 227 to the CEP electronics suite 220. In addition, at least one secondary oscillatory signal 222 (f R) may be directed to the CEP electronics suite 220 from the oscillator 142. For example, in one embodiment, the repetition rate of the oscillator may be provided in some cases because the AOFS efficiency is higher at higher frequencies (e.g. 100 MHz). In an alternate embodiment, the secondary oscillator signal 222 may represent the at least one characteristic of the repetition rate of the oscillator 142. In one embodiment, the secondary oscillator signal 222 relays information relating to the repetition rate (or a multiple of the repetition rate) of the oscillator 142. In one embodiment, the secondary oscillator signal 222 may be used to optimize the performance of the AOFS 150, though those skilled in the art will appreciate the secondary oscillator signal 222 is not necessary for performance of the system 140. The phase shifter 232 receives the secondary oscillator signal 222 and the PID signal 212 from the controller device 210 based on the fast loop electrical signal 201. The phase shifter 232 outputs at least one correction signal 234 to the CEP electronic suite 220. The CEP electronic suite 220 outputs at least one signal 236 to the AOFS 150 based on the CE phase data received from or derived from the fast loop electrical signal 201 and the CEP electronics signal 234 (fc E). Thereafter, the AOFS 150 may be configured to selectively adjust or alter the carrier envelope frequency and phase of the oscillator output signal 144 to produce the AOFS output signal 152. Like the previous embodiment, the CEP-stabilized regenerative amplifier system 140 shown in FIG. 3 includes a feedback system wherein at least one of the AOFS 150, stretcher 154, and/or compressor 166 may be adjusted based on correction signal 236 which includes information transmitted thereto from the slow loop electrical signal 191 and/or the fast loop electrical signal 201. Further, data received from the oscillator 142 may also be used in generating the correction signal 236. As such, the oscillator 142 may similarly be configured to receive the correction signal 236.

Figure 4:
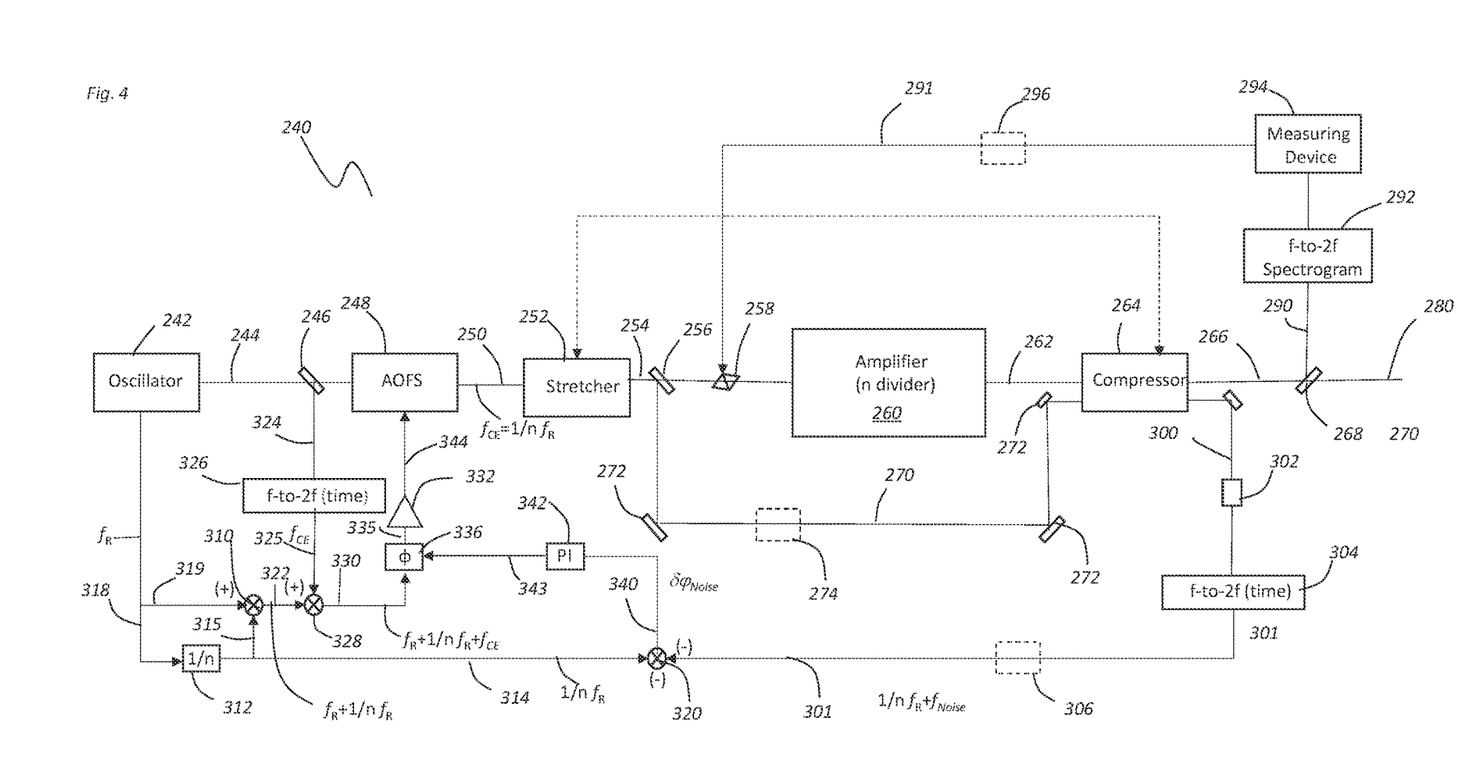
FIG. 4 shows a schematic diagram of another embodiment of an ultra-short pulse amplifier system having a carrier envelope phase stabilization architecture.

FIG. 4 shows another embodiment of a CEP-stabilized regenerative amplifier system which incorporates AOFS module therein. As shown, the amplifier system 240 includes at least one oscillator 242 configured to output at least one oscillator output signal 244 and at least one oscillator reference signal 318. Like the previous embodiment, the oscillator 242 comprises at least one Ti:Sapphire oscillator although those skilled in the art will appreciate that any variety of oscillator devices may be used in the present system. The oscillator output signal 244 may have a repetition rate of about 60 MHz to about 100 MHz, although the oscillator 242 may have any desired repetition rate. At least one beam splitter 246 may be configured to direct at least a portion of the oscillator output signal 244 to form at least one the oscillator analysis signal 324 which is directed to at least one interferometer 326, such as a f-to-2f interferometer device 326 or any other optical characteristic measuring device or system. The interferometer 326 may be configured to receive the oscillator analysis signal 324 from the beam splitter 246 and analyze at least one characteristic of the oscillator analysis signal 324. For example, the interferometer 326 may be configured to examine at least one temporal characteristic of the oscillator analysis signal 324. Thereafter, the oscillator analysis electrical signal 325 may be directed to at least one junction or summing device 328.

As shown in FIG. 4, at least a portion of the oscillator output signal 244 may be directed into at least one AOFS module 248. In one embodiment, the AOFS module 248 may be configured to output at least one AOFS output signal 250 which may be directed to at least one stretcher 252. Like the previous embodiment, the stretcher 252 may be configured to temporally stretch the AOFS output signal 250 having a pulse width from about 5 fs to about 100 fs to produce at least one amplifier input signal 254 having pulse width from about 10 ps to about 100 ps or more. The amplifier input signal 254 may be directed to at least one beam splitter or similar device 256 configured to produce at least one amplifier bypass signal 270. In addition, a portion of the amplifier input signal 254 may be directed into at least one amplifier 260 configured to produce at least one amplifier output signal 262. In one embodiment, the amplifier 260 comprises regenerative amplifier, although those skilled in the art will appreciate that any variety of amplifier devices or systems may be used with the present system. Optionally, the amplifier output signal 262 may have a repetition rate of about 5000 times to about 150,000 times slower than repetition rate of the oscillator output signal 244 emitted from the oscillator 242. In another embodiment, the amplifier output signal 262 may have a repetition rate of about 8000 times to about hundred 80,000 times slower than repetition rate of the oscillator output signal 244 from the oscillator 242 via the AOFS 248 and stretcher 252.

As shown in FIG. 4, the amplifier output signal 262 is directed into at least one compressor 264. Further, the compressor 264 may be configured to receive at least a portion of the amplifier bypass signal 270. One or more mirrors 272 may be configured to direct at least a portion of the amplifier bypass signal 270 and the compressor 264. Optionally, at least one optional optical device or system 274 may be used to condition or otherwise modify the amplifier bypass signal 270. Optional optical devices 274 include, without limitations, measuring devices, sensors, analyzers, gratings, filters, lenses, mirrors, beam dumps, beam splitters, and the like. Like the previous embodiment, the compressor 264 may be tuned to compress the temporal changes introduced into the AOFS output signal 250 (and by extension the oscillator signal 244) introduced by the stretcher 252 and amplifier 260. As such, the stretcher 252 may be selected to alter at least one temporal characteristic an input signal while the compressor 264 may be configured to reverse the temporal effects of the altered temporal characteristic introduced by the stretcher 252 and amplifier 260.

Referring again to FIG. 4, the compressor 264 may be configured to output at least one compressor output signal 280 from the CEP-stabilized regenerative amplifier system 240. As shown, at least one beam splitter 268 may direct at least a portion of the compressor output signal 280 to form at least one slow loop signal 290. As shown, like the previous embodiment, at least one interferometer 292 may be configured to observe/analyze at least one optical characteristic of the slow loop optical signal 290 and output at least one slow loop electrical signal 291. For example, the slow loop interferometer 292, in cooperation with at least one measuring device 294, may be configured to provide data or selectively vary the operation of at least one device within the amplifier system 240 to compensate for CEP drift. In another embodiment, the slow loop interferometer 292 and measuring device 294 may be used to adjust CE phase values. In one embodiment, the interferometer 292 comprises a f-to-2f device configured to spectrogram or similar spectral representation of the compressor output signal 280. Those skilled in the art will appreciate that any variety of interferometers of spectral analyzers may be used in the present system. Further, the measuring devices 294 may similarly be used in the present system to measure any variety of electrical signals representing of in relation to phase characteristics of the slow loop signal 290. Optionally, one or more optical devices 296 may be used to measure or otherwise condition the slow loop electrical signal 291. As shown in FIG. 4, the prism pair 258 or similar beam combining device may be adjusted to vary at least one optical characteristic of the amplifier input signal 254. Those skilled in the art will appreciate that the prism pair 258 may be positioned on a selectively movable optical mount (not shown). Optionally, the slow loop electrical signal 291, or a portion thereof, may be directed into at least one of the stretcher 252, and/or compressor 264. Optionally, the slow loop signal 291 may eb directed to the AOFS 248, with the inclusion of at least one phase shifting or modifying device prior to the AOFS 248. (See FIG. 2). As such, the CEP-stabilized regenerative amplifier system 240 shown in FIG. 4 need not include the beam combining device 258.

As shown in FIG. 4, the compressor 264 may be configured to output at least one fast loop optical signal or feedback signal 300. Like the previous embodiment, the fast loop optical signal 300 may comprise the compressed unamplified forward bypass signal 270 received from the stretcher 252. In one embodiment, the fast loop optical signal 300 is directed to one or more dispersion mediums or devices 302 and at least one fast loop interferometer or similar analyzing device or system 304, similar to the devices described in FIG. 2. The fast loop interferometer 304 may be configured to measure the carrier envelope offset frequency ($f_{CE}=1/n\ f_R$) of the oscillator 242 and output at least one fast loop electrical signal 301 representative of the carrier envelope offset frequency. In addition, the fast loop interferometer 304 may be configured to measure the frequency of the carrier envelope phase noise in time ($f_{noise}$) introduced by the combination of the stretcher 252 and the compressor 264. Further, optionally, one or more additional optional devices or systems 306 may be configured to receive and/or modify, measure, and/or otherwise condition the fast loop electrical signal 301. Optional devices 306 include, without limitations, electronic amplifier frequency filters, amplifiers, and the like.

Referring again to FIG. 4, the oscillator 242 may be configured to generate at least one secondary oscillator signal 318. Like the previous embodiments, the secondary oscillator signal 318 may relate to the repetition rate of the oscillator 242. In an alternate embodiment, the secondary oscillator signal 318 may represent the at least one characteristic of the repetition rate of the oscillator 242. A portion of the secondary oscillator signal 318 may be directed to at least a frequency divider device 312. Further, a portion of the secondary oscillator signal 318 may be directed to a junction or frequency mixer device 310. During use, the frequency divider device 312 may be configured to divide the repetition frequency of the secondary oscillator output signal 318, which represents the repetition rate of the oscillator 242, by an integer number. For example, the repetition rate may be divided by 4. In another embodiment, the repetition rate of the oscillator 462 may be divided by 3, 4, 5, 6, 7, 8, or more. Thereafter, the frequency divider device 312 generates at least one output signal. At shown, at least one frequency divider device output signal 315 is directed to the frequency mixer device 310 where the frequency divider device output signal 315 and a portion of the oscillator reference signal 319 are combined to form at least one combined signal 322. Further, a second frequency divider device output signal 314 is directed to another frequency mixer device 320. The frequency mixer device 320 compares the frequencies of the second frequency divider device output signal 314 and the fast loop electrical signal 301 and determines a frequency difference representative of the time-dependent phase difference between the output of the oscillator 242 and the output of the stretcher 252-amlifier 260-compressor 264 system and outputs at least one fast signal 340. As shown, the fast signal 340 may be directed to at least one controller 342 such as a PID controller or similar controllers as described above. Thereafter, the controller 342 outputs at least one control signal 343 to at least one phase shifter or similar devise 336.

As shown in FIG. 4, combined signal 322 is combined with the oscillator analysis signal 325 by the frequency mixer device 328 to form at least one phase shifter input signal 330 which may be directed into at least one phase shifter 336. The phase shifter 366 outputs at least one phase shifted signal 335 in response to the information received from the phase shifter input signal 330 and the control signal 343. At least one amplifier 332 receives the phase shifter output signal 335 from the phase shifter 336 and forms at least one amplified correction signal 344 which may be directed to the AOFS module 248. In one embodiment, the correctional signal 344 is configured to correct for carrier envelope phase variations introduced by the stretcher 252, amplifier 260, and the compressor 264.

Figure 5:
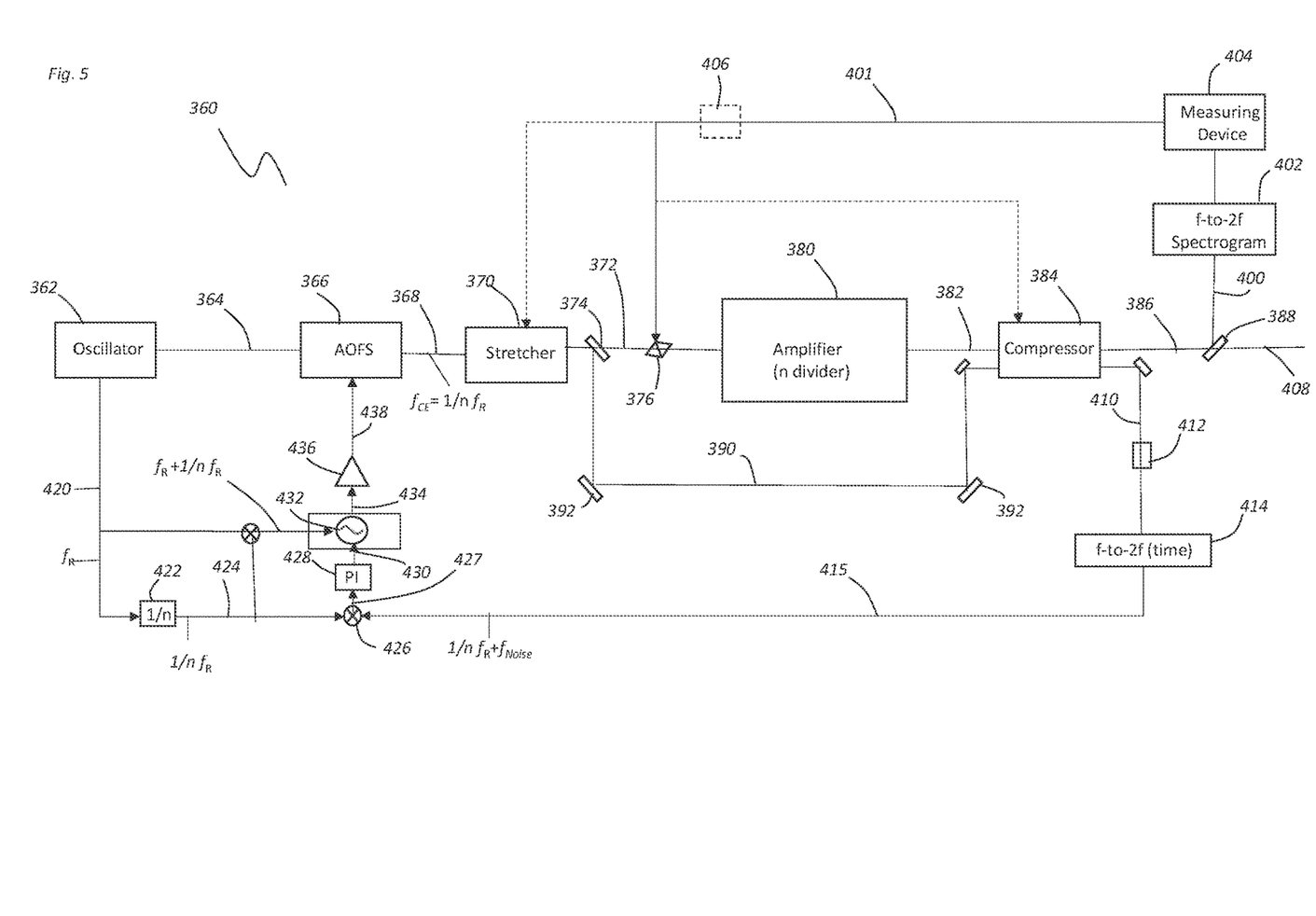
FIG. 5 shows a schematic diagram of another embodiment of an ultra-short pulse amplifier system having a carrier envelope phase stabilization architecture.

FIG. 5 shows yet another embodiment of a CEP-stabilized regenerative amplifier system which incorporates AOFS module therein. As shown, the amplifier system 360 includes at least one oscillator 362 configured to output at least one oscillator output signal 364 and at least one secondary oscillator signal 420. Like the previous embodiment, the oscillator 362 comprises at least one Ti:Sapphire oscillator although those skilled in the art will appreciate that any variety of oscillator devices may be used in the present system. The oscillator output signal 364 may be directed into at least one AOFS module or system 366. Like the previous embodiments, the AOFS module 366 may be configured to output at least one AOFS output signal 368 which may be directed to at least one stretcher 370. The stretcher 370 may be configured to temporally stretch the AOFS output signal 368 having a pulse width from about 5 fs to about 100 fs to produce at least one amplifier input signal 372 having pulse width from about 10 ps to about 100 ps or more. The amplifier input signal 372 may be directed to at least one beam splitter 374 configured to produce at least one amplifier bypass signal 390. In addition, a portion of the amplifier input signal 372 may be directed into at least one amplifier 380 configured to produce at least one amplifier output signal 382. In one embodiment, the amplifier output signal 382 may have a repetition rate of about 5000 times to about hundred 150,000 times slower than repetition rate of the oscillator output signal 364 emitted from the oscillator 362. In another embodiment, the amplifier output signal 382 may have a repetition rate of about 8000 times to about hundred 80,000 times slower than repetition rate of the oscillator output signal 364 from the oscillator 362 via the AOFS 366 and stretcher 370.

As shown in FIG. 5, the amplifier output signal 382 is directed into at least one compressor 384. Further, the compressor 384 may be configured to receive at least a portion of the amplifier bypass signal 390. One or more mirrors 392 may be configured to direct at least a portion of the amplifier bypass signal 390 and the compressor 384. Like the previous embodiments, at least one optional optical device or system (not shown) may be used to condition or otherwise modify the amplifier bypass signal 390. In one embodiment, the compressor 384 may be tuned to compress the temporal changes introduced into the AOFS output signal 368 (and by extension the oscillator output signal 364) by the stretcher 370 and amplifier 380. As such, the stretcher 370 may be selected to alter at least one temporal characteristic of an input signal while the compressor 384 may be configured to reverse the temporal effects of the altered temporal characteristic introduced by the stretcher 370 and amplifier 380.

Referring again to FIG. 5, the compressor 384 may be configured to output at least one compressor output signal 408 from the CEP-stabilized regenerative amplifier system 360. As shown, at least one beam splitter 388 may direct at least a portion of the compressor output signal 408 to form at least one slow loop signal 400. Again, like the previous embodiments, at least one interferometer 402 may be configured to observe/analyze at least one optical characteristic of the slow loop signal 400 and output at least one slow loop electrical signal 401. For example, the slow loop electrical signal 401 outputted from the slow loop interferometer 402 may be configured to compensate for CEP drift, adjust CE phase values. In one embodiment, the interferometer 402 comprises a f-to-2f device configured to spectrogram or similar spectral representation of the output signal 400. In addition, one or more measuring devices 404 may be configured to determine the carrier envelope phase of the slow loop optical signal 400 based on the slow loop electrical signal 401 from the interferometer 402. Those skilled in the art will appreciate any variety of measuring devices may be used as the measuring device 402 and may be configured to measure any variety of characteristics of the slow loop electrical signal 401. Optionally, one or more additional optional devices 406 may be used to measure or otherwise condition the slow loop electrical signal 401. As shown in FIG. 5, at least one of the AOFS 366, stretcher 370, and/or beam combining device or prism pair 376 may be adjusted to vary at least one optical characteristic of the amplifier input signal 372. Optionally, the slow loop electrical signal 401, or a portion thereof, may be directed into the compressor 384. As such, the CEP-stabilized regenerative amplifier system 360 shown in FIG. 5 need not include the beam combining device 376.

As shown in FIG. 5, the compressor 384 may be configured to output at least one fast loop optical signal or feedback signal 410. The fast loop optical signal 410 may comprise the compressed unamplified forward bypass signal 390 received from the stretcher 370. In one embodiment, the fast loop optical signal 410 is directed to one or more dispersion mediums or devices 412 and at least one fast loop interferometer or similar analyzing device or system 414, similar to the devices described above. In one embodiment, the fast loop interferometer 414 may be configured to measure the carrier envelope offset frequency ($f_{CE}$) of the oscillator 362 and output at least one fast loop electrical signal 415. In addition, the fast loop interferometer 414 may be configured to measure the frequency of the carrier envelope phase noise in time ($f_{noise}$) introduced by the combination of the stretcher 370, amplifier 380, and/or the compressor 384 based on the fast loop electrical signal outputted by the interferometer 414. Optionally, one or more additional optional optical devices or systems (not shown) may be configured to receive and/or modify, measure, and/or otherwise condition the fast loop signal 410. Optional devices include, without limitations, analyzers, meters, choppers, filters, polarizers, waveplates, and the like.

Referring again to FIG. 5, the oscillator 362 may be configured to generate at least one secondary oscillator signal 420. The secondary oscillator signal 420 may be directed to a at frequency divider device 422. Like the previous embodiments, the secondary oscillator signal 420 relate to the repetition rate of the oscillator 362. In an alternate embodiment, the secondary oscillator signal 420 may represent the at least one characteristic of the repetition rate of the oscillator 362. During use, the frequency divider device 422 generates at least one output signal 424. At shown, the frequency divider device output signal 424 is directed to frequency mixer device 426. The output 427 of the frequency mixing device 426 enables a comparison of the frequency noise between the fast loop electrical signal 415 and the output signal 424 and forms at least one combined fast signal 430. As shown, the combined fast signal 430 may be directed to at least one controller 428 such as a PID controller or similar controllers as described above. Thereafter, the combined fast signal 430 is directed from the controller 428 to at least one voltage controlled oscillator or signal generator or similar device 432. Those skilled in the art will appreciate that any variety of signal generating devices may be used in the present system. In one embodiment, the signal generating device 432 generates at least one correction signal based on the combination of the frequency divider device output signal 424 and the fast loop signal 410.

As shown in FIG. 5, at least one combined signal 434 is outputted from the signal generator 432 and directed into at least one amplifier 436. The amplifier amplifies the combined signal 434 and forms at least one amplified signal 438 which is directed to the AOFS module 366. Optionally, the amplified signal 438 may be directed to the AOFS module 366, the stretcher 370, the amplifier 380, and/or the compressor 384. In one embodiment, the combined signal 434 is configured to correct for carrier envelope phase variations introduced by the stretcher 370 and the compressor 384. Like the previous embodiments, the feedback provided by the correction signal 438 is based on the data received by at least one of the slow loop electrical signal 401 and the fast loop electrical signal 415. Further, data received from the oscillator 362 may also be used in generating the correction signal 438. As such, the oscillator 362 may similarly be configured to receive the correction signal 438.

Figure 6:
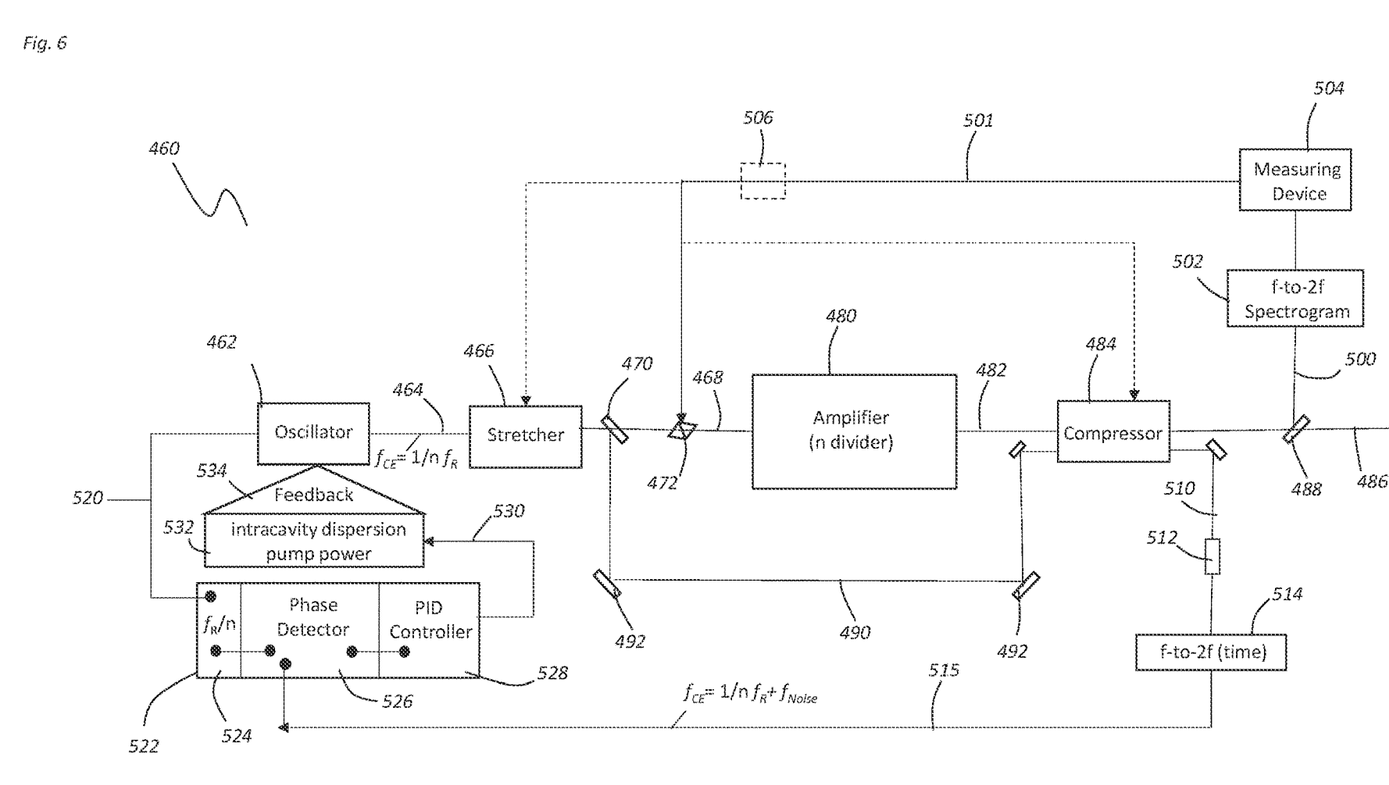
FIG. 6 shows a schematic diagram of another embodiment of an ultra-short pulse amplifier system having a carrier envelope phase stabilization architecture.

FIG. 6 shows yet another embodiment of a CEP-stabilized regenerative amplifier system. As shown, the amplifier system 460 includes at least one oscillator 462 configured to output at least one oscillator output signal 464 and at least one oscillator reference signal 520. Like the previous embodiment, the oscillator 462 comprises at least one Ti:Sapphire oscillator although those skilled in the art will appreciate that any variety of oscillator devices may be used in the present system. The oscillator signal 464 may be directed into at least one stretcher 466. The stretcher 466 may be configured to temporally stretch the oscillator output signal 464 having a pulse width from about 5 fs to about 100 fs to produce at least one stretcher output signal 468 having pulse width from about 10 ps to about 100 ps or more. The stretcher output signal 468 may be directed to at least one beam splitter 470 configured to produce at least one amplifier bypass signal 490. In addition, a portion of the stretcher output signal 468 may be directed into at least one amplifier 480 configured to produce at least one amplifier output signal 482. In one embodiment, the amplifier output signal 482 may have a repetition rate of about 5000 times to about hundred 150,000 times slower than repetition rate of the oscillator signal 464 emitted from the oscillator 462. In another embodiment, the amplifier output signal 482 may have a repetition rate of about 8000 to about 180,000 times slower than repetition rate of the oscillator signal 464 from the oscillator 462 via the stretcher 466.

As shown in FIG. 6, the amplifier output signal 482 is directed into at least one compressor 484. Further, the compressor 484 may be configured to receive at least a portion of the amplifier bypass signal 490. One or more mirrors 492 may be configured to direct at least a portion of the amplifier bypass signal 490 into the compressor 484. Like the previous embodiments, at least one optional optical device or system (not shown) may be used to condition or otherwise modify the amplifier bypass signal 490. In one embodiment, the compressor 484 may be tuned to compress the temporal changes introduced by the stretcher 466 and amplifier 480. As such, the stretcher 466 may be selected to alter at least one temporal characteristic of an input signal while the compressor 484 may be configured to reverse the temporal effects of the altered temporal characteristic introduced by the stretcher 466 and amplifier 480.

Referring again to FIG. 6, the compressor 484 may be configured to output at least one compressor output signal 486 from the CEP-stabilized regenerative amplifier system 480. As shown, at least one beam splitter 488 may direct at least a portion of the output signal 486 to form at least one slow loop signal 500. Again, like the previous embodiments, at least one interferometer 502 may be configured to observe/analyze at least one optical characteristic of the slow loop signal 500 and output at least one slow loop electrical signal 501. For example, the slow loop interferometer 502 may be configured to compensate for CEP drift, adjust CE phase values, or otherwise measure and analyze the slow loop signal 500. In one embodiment, the interferometer 502 comprises a f-to-2f device capable of outputting at least one slow loop electrical signal 501 such as a spectrogram or similar spectral representation of the slow loop signal 500. In addition, one or more measuring devices 504 may similarly be used in the present system to measure any variety of characteristics. Optionally, one or more optional devices 506 may be used to measure or otherwise condition the slow loop electrical signal 500. As shown in FIG. 6, the slow loop electrical signal 501 may be directed to at least one of the stretcher 466, the compressor 484, and/or the oscillator 462 thereby permitting adjustment modification of the stretcher output signal 468 and/or oscillator signal 464. Optionally, the slow loop signal 500, or a portion thereof, may to at least one beam combiner or prism pair 472. In another embodiment, the CEP-stabilized regenerative amplifier system 460 shown in FIG. 6 need not include the beam combining device 472.

As shown in FIG. 6, the compressor 484 may be configured to output at least one fast loop signal or feedback signal 510. Like the previous embodiment, the fast loop signal 510 may comprise the compressed unamplified forward bypass signal 490 received from the stretcher 466. In one embodiment, the fast loop signal 510 is directed to one or more dispersion mediums or devices 512 and at least one fast loop interferometer or similar analyzing device or system 514, similar to the devices described above. In one embodiment, the fast loop interferometer 514 may be configured to measure the carrier envelope offset frequency ($f_{CE}$) determined by the oscillator 462 and output at least one fast loop electrical signal 515. Further, the fast loop interferometer 514 may be configured to measure the frequency of the carrier envelope phase noise in time ($f_{noise}$) introduced by the combination of the stretcher 466, Amplifier 480, and/or compressor 484. Optionally, one or more additional optional optical devices or systems (not shown) may be configured to receive and/or modify, measure, and/or otherwise condition the fast loop electrical signal 515. Optional devices include, without limitations, analyzers, frequency meters, RF filters, and the like.

Referring again to FIG. 6, the oscillator 462 may be configured to output at least one reference signal 520 having a reference signal frequency (f r). The oscillator reference signal 520 may be directed into a fast loop analysis system 522 configured to receive both the oscillator reference signal 520 and at least a portion of the fast loop signal 515. In one embodiment, the fast loop analysis system 522 includes at least one frequency divider 524 in communication with at least one phase detector 526. Like the embodiment shown in FIG. 4, the frequency divider 524 may be configured to divide the repetition frequency of the oscillator signal 520 by an integer number. For example, the repetition rate may be divided by 4. In another embodiment, the repetition rate of the oscillator 462 may be divided by 2, 3, 4, 5, 6, 7, 8, or more. In the illustrated embodiment, the divided reference signal of the oscillator 462 and the fast loop signal 515 is directed to the phase detector 526. The phase detector 526 measures the phase difference of the fc E of the fast loop electrical signal 515 and the divided repetition frequency of the oscillator 462 and provides the error signal for the PID controller 528. The PID controller 528 generates at least one control signal 530 which is applied to optical elements in the oscillator 462 to change the intra cavity dispersions and thus the fc E either via the pump power or optical intra cavity dispersion elements or both. For example, in one embodiment, the frequency ($f_{ce}$) of the intracavity phase slip may be adjusted to match the frequency ($f_R/n$) of the divided reference signal 520 from the oscillator 462.

As shown in FIG. 6, at least one correction 530 is outputted from the PID controller 528 to the oscillator 462. In the illustrated embodiment, the correction signal 530 may be used to adjust one or more parameters of the oscillator 462. For example, as shown, the correction signal 530 may be used to adjust the intracavity dispersion pump power 532 of the oscillator 462 via at least one feedback signal 534. Although not shown in FIG. 6, those skilled in the art will appreciation that the correction signal 530 may be sent to at least one of the stretcher 466, the amplifier 480, the compressor 484, or any other devices or components in the amplifier system 460. Optionally, the correction signal 530 may be used to adjust the amplifier system 460. The dispersion introduced into the oscillator signal 464 can be varied, for example, by changing the pump power of the oscillator pump laser, by intra cavity wedges, etc. Prior art systems configured to address changes in the dispersion in the amplifier system 460 by placing the f-to-2f directly after the oscillator 462 to stabilize the $f_{CE}$ of the oscillator 462. As with the other embodiments disclosed in the present application, the fast loop interferometer 514 (f-to-2f) is placed after the amplifier so that the CEP noise of the amplifier can be measured as well. As in the other embodiments, the slow loop interferometer 502 may be used to adjust slow CEP drifts and set CEP values. Feedback may be provided by the correction signal 530 is based on the data received by at least one of the slow loop electrical signal 501 and the fast loop electrical signal 515 to the oscillator 462.

The embodiments disclosed herein are illustrative of the principles of the invention. Other modifications may be employed which are within the scope of the invention. Accordingly, the devices disclosed in the present application are not limited to that precisely as shown and described herein.

What is claimed:

1. A laser amplifier system having a carrier envelope phase stabilization architecture for generating ultrashort laser pulses, comprising:
    at least one oscillator configured to output at least one oscillator output signal;
    at least one stretcher configured to temporally stretch the pulse width of the oscillator output signal to produce at least one stretcher output signal;
    at least one beam splitter configured to generate at least one amplifier input signal and at least one forward bypass signal;
    at least one amplifier configured to receive and amplify the at least one amplifier input signal and produce at least one amplifier output signal;
    at least one compressor configured receive and temporally compress the amplifier output signal and the forward bypass signal and output at least one fast loop signal, and at least one compressor output signal;
    at least one fast loop analyzing device configured to receive the at least one fast loop signal and measure at least one of a carrier envelope offset frequency ($f_{ce}$) and a carrier envelope noise ($f_{noise}$) introduced by stretcher and compressor;
    at least one analyzing device in communication with the at least one fast loop analyzing device, the at least one analyzing device configured to generate at least one correction signal based on at least one of a carrier envelope offset frequency ($f_{ce}$) and a carrier envelope noise ($f_{noise}$); and
    at least one frequency shifting device configured to selectively vary at least one frequency characteristic of the at least one of the at least one oscillator output signal, the at least one stretcher output signal.

2. The laser amplifier system of claim 1 wherein the at least one oscillator comprises at least one Ti:sapphite oscillator.

3. The laser amplifier system of claim 1 wherein the at least one oscillator output signal has a pulse duration of ten (10) femtoseconds to three hundred (300) femotseconds.

4. The laser amplifier system of claim 1 wherein the at least one oscillator has a repetition rate of ten (10) megahertz to two hundred (200) megahertz.

5. The laser amplifier system of claim 1 wherein the at least one stretcher has a repetition rate of ten (10) megahertz to two hundred (200) megahertz.

6. The laser amplifier system of claim 1 wherein the at least one stretcher output signal has a pulse width of ten (10) picoseconds or more.

7. The laser amplifier system of claim 1 wherein the at least one stretcher output signal has a pulse width of one hundred (100) picoseconds or more.

8. The laser amplifier system of claim 1 wherein the amplifier comprises a regenerative amplifier.

9. The laser amplifier system of claim 1 further comprising at least one slow loop analyzing device configured to receive at least a portion of the at least one compressor output signal and measure at least one of a carrier envelope phase of the at least one compressor output signal and to generate at least one phase correction signal.

10. The laser amplifier system of claim 9 wherein the at least one phase correction signal is provided to at least one of the at least one stretcher, at least one compressor and the frequency shifting device.

11. The laser amplifier system of claim 1 wherein the at least one fast loop analyzing device further comprises at least one f-to-2f interferometer configured to measure at least one of the carrier envelope offset frequency ($f_{ce}$) and the carrier envelope noise ($f_{noise}$) introduced into the at least one amplifier output signal by at least one of the at least one stretcher and at least one compressor.

12. The laser amplifier system of claim 1 wherein the at least one slow loop analyzing device comprises at least one slow loop f-to2f interferometer configured to measure the carrier envelope phase drift of the at least one slow loop signal; and
    at least one measuring device configured to measure at least one spectral characteristic of the slow loop signal.

13. A method of stabilizing the carrier envelope phase of an ultrashort laser pulse from a laser amplifier system, comprising:
    providing at least one oscillator output signal;
    temporally stretching the oscillator output signal to produce at least one stretcher output signal;
    forming at least one amplifier input signal and at least one forward bypass signal from the stretcher output signal;

directing the at least one amplifier input signal into at least one amplifier configured to output at least one amplifier output signal;
directing the at least one forward signal to the at least one compressor;
compressing the amplifier output signal with a compressor to form at least one compressor output signal;
compressing the forward bypass signal with the compressor to form at least one fast loop signal;
measuring the fast loop signal with at least one analyzing device to determine at least one carrier envelope offset frequency ($f_{ce}$), and the carrier envelope noise ($f_{noise}$);
generating at least one correction signal based on at least one of the at least one of the carrier envelope offset frequency ($f_{ce}$), the carrier envelope noise ($f_{noise}$); and
adjusting at least one frequency characteristic of at least one of the oscillator signal and the stretcher output signal based on the at least one correction signal.

14. The method of claim 13 further comprising:
directing the at least one correction signal to the at least one oscillator; and
adjusting at least one frequency characteristic of the at least one oscillator output signal based on the at least one correction signal.

15. The method of claim 13 further comprising directing the at least one correction signal to at least one frequency shifter device and adjusting the at least one frequency characteristic of the stretcher output signal with the frequency shifting device prior to amplification of the stretcher output signal.

16. The method of claim 13 further comprising:
forming to at least one slow loop signal from at least a portion of the at least one compressor output signal;
analyzing the at least one slow loop signal with at least one f-to-2f interferometer configured to measure at least one phase characteristic of the at least one slow loop signal;
generating the at least one phase correction signal with at least one phase shifter;
directing the at least one phase correction signal to at least one of the at least one stretcher, the at least one compressor, and at least one frequency shifting device; and
adjusting at least one phase characteristic of at least one of the at least one oscillator output signal, at least one stretcher output signal, at least one amplifier output signal, and at least one compressor output signal based on the at least one correction signal.

17. A method of stabilizing the carrier envelope phase of an ultrashort laser pulse from a laser amplifier system, comprising:
outputting at least one oscillator output signal from at least one oscillator;
temporally stretching the at least one oscillator output signal with at least one stretcher to form at least one stretcher output signal;
forming at least one amplifier input signal and at least one forward bypass signal from the at least one stretcher output signal;
amplifying the at least one amplifier input signal with at least one amplifier to form at least one amplifier output signal;
compressing the at least one amplifier output signal and at least one forward bypass signal with at least one compressor to produce at least one compressor output signal and at least one fast loop signal;
measuring the carrier envelope offset frequency ($f_{ce}$) and the carrier envelope noise ($f_{noise}$) of the at least one fast loop signal and generating at least one correction signal; and
adjusting at least one frequency characteristic of the at least one amplifier input signal based on the at least one correction signal.

18. The method of claim 17 further comprising:
forming at least one slow loop signal from at least a portion of the at least one compressor output signal;
measuring the at least one slow loop signal with at least one f-to-2f interferometer configured to measure phase drift of the at least one slow loop signal;
generating the at least one phase correction signal with at least one phase shifter based on the measure phase drift;
directing the at least one phase correction signal to at least one of the at least one stretcher, the at least one compressor, and at least one frequency shifting device; and
adjusting at least one phase characteristic of at least one of the at least one oscillator output signal, at least one stretcher output signal, at least one amplifier output signal, and at least one compressor output signal based on the at least one correction signal.

19. A laser amplifier system having a carrier envelope phase stabilization architecture for generating ultrashort laser pulses, comprising:
at least one oscillator configured to output at least one oscillator output signal;
at least one stretcher configured to temporally stretch the pulse width of the oscillator output signal to produce at least one stretcher output signal;
at least one beam splitter configured to generate at least one amplifier input signal and at least one forward bypass signal;
at least one amplifier configured to receive and amplify the at least one amplifier input signal and produce at least one amplifier output signal;
at least one compressor configured receive and temporally compress the amplifier output signal and the forward bypass signal and output at least one fast loop signal, and at least one compressor output signal;
at least one fast loop analyzing device configured to receive the at least one fast loop signal and measure at least one of a carrier envelope frequency and a carrier envelope of frequency noise introduced by stretcher and compressor of the at least one fast loop signal;
at least one analyzing device in communication with the at least one fast loop analyzing device and the at least one oscillator, the at least one analyzing device configured to generate at least one correction signal based on a at the carrier envelope frequency and a carrier envelope of frequency of the at least one fast loop signal and provide the at least one correction signal to the at least one oscillator.

20. A method of stabilizing the carrier envelope phase of an ultrashort laser pulse from a laser amplifier system, comprising:
providing at least one oscillator output signal;
temporally stretching the oscillator output signal to produce at least one stretcher output signal;
forming at least one amplifier input signal and at least one forward bypass signal from the stretcher output signal;
directing the at least one amplifier input signal into at least one amplifier configured to output at least one amplifier output signal;

directing the at least one amplifier output signal being to at least one compressor;
directing the at least one forward signal to the at least one compressor;
compressing the amplifier output signal with at least one compressor to form at least one compressor output signal;
compressing the forward bypass signal with the at least one compressor to form at least one fast loop signal;
measuring the fast loop signal with at least one analyzing device to determine at least one carrier envelope offset frequency ($f_{ce}$) and the carrier envelope noise ($f_{noise}$);
generating at least one correction signal based on at least one of the at least one of the carrier envelope offset frequency ($f_{ce}$) the carrier envelope noise ($f_{noise}$); and
adjusting the at least one oscillator to vary at least one frequency characteristic of at least one of the oscillator signal based on the at least one correction signal.

* * * * *